United States Patent
Chiu

(10) Patent No.: US 7,167,980 B2
(45) Date of Patent: Jan. 23, 2007

(54) DATA COMPARISON PROCESS

(75) Inventor: Chun Yang Chiu, Beaverton, OR (US)

(73) Assignee: Intel Corporation, Santa Clara, CA (US)

(*) Notice: Subject to any disclaimer, the term of this patent is extended or adjusted under 35 U.S.C. 154(b) by 804 days.

(21) Appl. No.: 10/161,106

(22) Filed: May 30, 2002

(65) Prior Publication Data

US 2003/0226021 A1    Dec. 4, 2003

(51) Int. Cl.
*H04L 9/00*    (2006.01)

(52) U.S. Cl. .................. 713/160; 713/161; 713/176; 713/179

(58) Field of Classification Search ............... 713/160, 713/176, 181
See application file for complete search history.

(56) References Cited

U.S. PATENT DOCUMENTS

| | | | |
|---|---|---|---|
| 5,787,169 A * | 7/1998 | Eldridge et al. | ............. 713/165 |
| 6,925,085 B1 * | 8/2005 | Krishna et al. | ........ 370/395.32 |
| 2003/0226021 A1 * | 12/2003 | Chiu | .......................... 713/181 |
| 2004/0013112 A1 * | 1/2004 | Goldberg et al. | ........... 370/389 |

* cited by examiner

*Primary Examiner*—Kambiz Zand
*Assistant Examiner*—Trang Doan
(74) *Attorney, Agent, or Firm*—Fish & Richardson P.C.

(57) ABSTRACT

A process for comparing data, such as signatures in a data packet, includes retrieving, from a first hash table, a target value that corresponds to a segment of the data, processing the data in accordance with the target value to produce a checksum, locating an entry in a second hash table using the checksum, and comparing the data to the entry.

27 Claims, 2 Drawing Sheets

DATA COMPARISON PROCESS

TECHNICAL FIELD

This application relates to a process for performing data comparison to identify, e.g., a signature in a data packet.

BACKGROUND

Networks transmit data between devices using constructs known as data packets. A data packet includes a header which contains routing and other identification information and a payload which includes substantive data. A data packet also contains a signature that identifies the packet to network devices. The signature may identify the type of the packet and its source and destination, for example.

Devices on a network locate and identify a packet's signature in order to process the packet. The signature may be located anywhere in the data packet. A process known as deep packet inspection is used to search through data in the packet in order to locate the signature.

DESCRIPTION OF THE DRAWINGS

Like reference numerals in different figures indicate like elements.

DESCRIPTION

Figure 1:
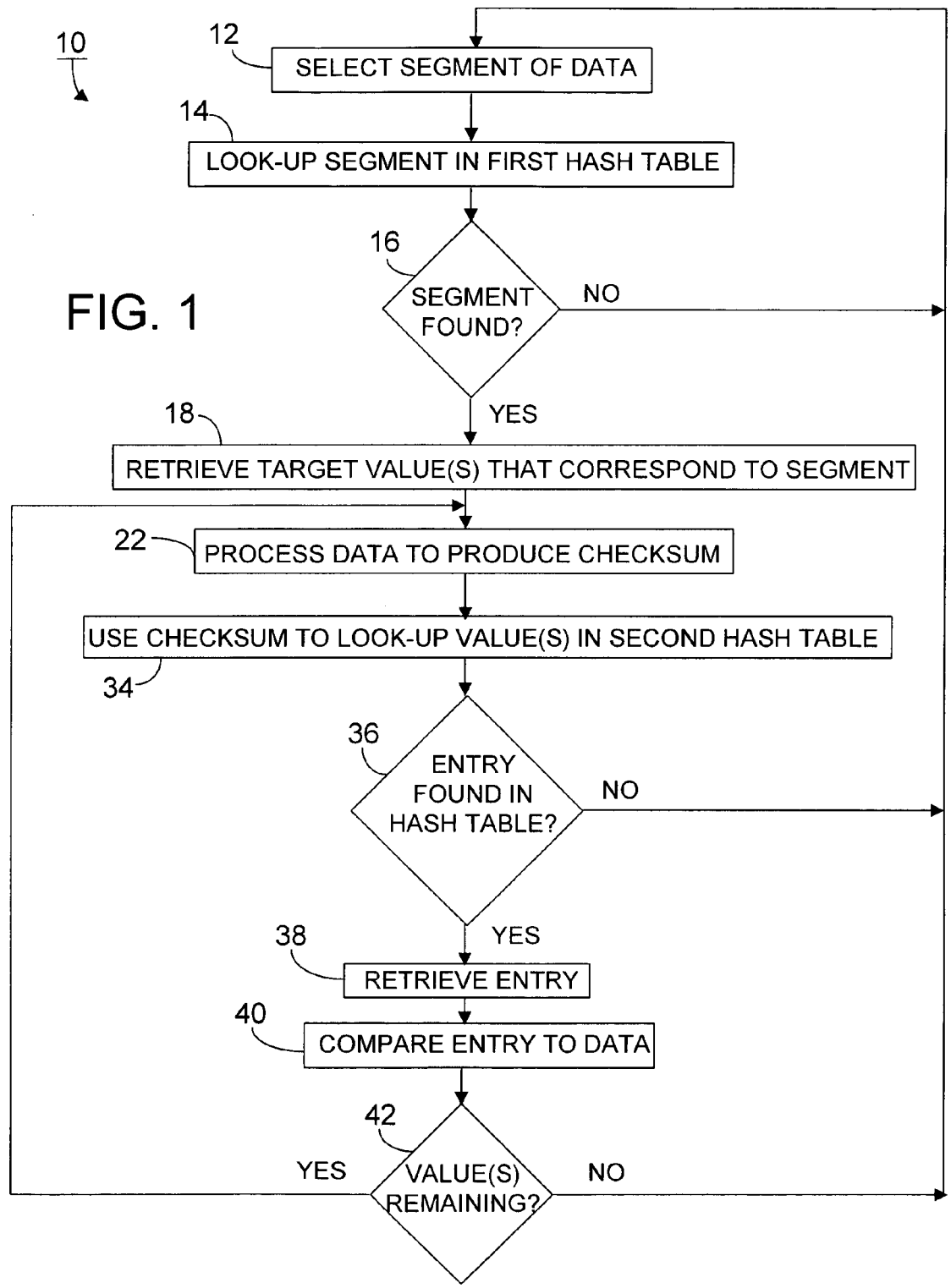
FIG. 1 is a flowchart showing a process for performing a data comparison process to locate a packet signature.

FIG. 1 shows process 10 for performing a deep packet inspection. Process 10 compares data, such as the signature of a data packet, to pre-stored data in order to determine if there is a match and, thus, to identify the signature. Process 10 can compare data from anywhere in the data packet, such as the header and payload, to locate the signature.

Process 10 receives a data packet, which includes a signature and other information. Process 10 selects (12) a segment of the data packet for comparison. Segments of data may be selected, in turn, from the data packet or specific portions, such as part of the packet header, may be selected.

Process 10 looks-up (14) the segment in a first hash table in order to determine if the segment is listed. The segment may constitute a portion, such as the beginning of, a packet signature. For example, if the packet signature is "0xAB 01 CD EF", where the prefix "0x" indicates that the data is hexadecimal, the data segment may be "AB". In this example, "AB" comprises a value of a first byte of the signature. It is noted, for reasons that will become apparent later, that different signatures may contain the same data segments. For example, the signature "0xAB 02 34" contains the same segment, namely "AB", as signature "0xAB 01 CD EF".

Figure 2:
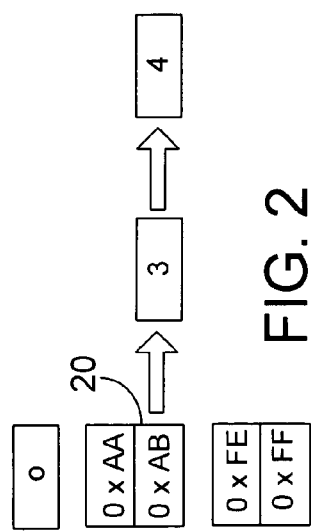
FIG. 2 is a block diagram of a hash table containing byte lengths that correspond to data segments.

If the segment is not found in the first hash table (16), process 10 selects (12) a new segment and repeats the foregoing. If the segment is found in the hash table (16), process 10 retrieves (18) a target value that corresponds to the segment in the hash table. In this regard, the hash table contains one or more values that are indicative of the length of a signature that contains the data segment. So, in the example described herein, the hash table may contain two values, namely, "3" for the signature "0xAB 02 34" (which contains three bytes of data) and "4" for the signature "0xAB 01 CD EF" (which contains four bytes of data). It is noted that process 10 is not limited to using lengths defined by the number of bytes in a signature and that process 10 can accommodate any lengths (e.g., bit length, word length, etc.). FIG. 2 shows an example of a hash table containing data segment "AB" 20 and values of "3" and "4" for that segment.

Process 10 processes (22) the data in accordance with the value from the first hash table in order to produce a checksum. That is, process 10 generates a checksum starting with the initial data segment and using the number of bytes from that data segment forward in the data. For example, if the value retrieved from the first hash table is "3", process 10 generates the checksum using three bytes, including the first byte, in this case "AB". If the value retrieved from the first hash table is "4", process 10 generates the checksum using four bytes, including the first byte, in this case "AB".

Using the example set forth above, process 10 first generates a checksum using three bytes, which correspond to the value retrieved for signature "0xAB 02 34". Process 10 uses this checksum to locate a value in a second hash table, also called the "signature hash table". This value is a predefined data signature, which is compared against the received data in order to determine if there is a match and, thus, to identify the packet by its signature.

In more detail, process 10 determines a key for the second hash table using the checksum. In this embodiment, assuming that the checksum is 32 bits, the formula for determining the key is as follows:

key=(32 bit checksum)mod(number of buckets in hash table).

Figure 3:
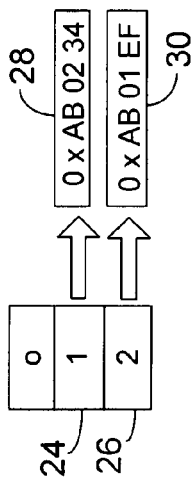
FIG. 3 is a block diagram of a hash table containing pre-stored signatures and their corresponding keys.

For the above example, if the checksums for "0xAB 01 CD EF" and "0xAB 02 34" are 5 and 10, respectively, and the bucket size of the hash table is three, then the keys have values of "1" and "2", respectively. The keys 24 and 26 and their corresponding values 28 and 30 are depicted in the hash table shown in FIG. 3. It is noted that methods other than determining keys in this manner may be used to access the data stored in the signature hash table.

Referring back to FIG. 1, and starting with signature "0xAB 02 34", process 10 uses (34) a key, such as that described above, to locate a corresponding entry from the signature hash table. If a corresponding entry is found (36), such as entry 28 for key "1" (FIG. 3), process 10 retrieves (38) that entry and compares (40) that entry to data in the data packet. Process 10 compares the entry to a number of bytes in the data packet, retrieved from the first hash table, starting with the initial data segment. Thus, for example, if the number retrieved from the first hash table is "3", process 10 compares "0xAB 02 34" from the data to the signature "0xAB 02 34" retrieved from the signature hash table. Since these two match, process 10 may output an indication that there is a match. If there is no match in the signature hash table, process 10 may output an indication.

Process 10 determines (42) if there are any values retrieved from the first hash table for which the signature hash table has not been referenced. If so, process 10 returns to block 22 and performs the remainder of process 10 for each remaining value. In the example given above, assume that a value of "4" was retrieved from the first hash table. Process 10 then generates a checksum using four bytes of data from the data packet starting with, and including, the initial data segment, i.e., "AB". If the same data segment is being used, then the checksum for the value of "4" can be generated using the checksum for the value of "3" and the incremental byte, in this case, one byte. Thus, the checksum can be generated incrementally, saving processing resources and time. The remainder of the process is identical to that described above. Once it has been completed, process 10 returns to block 12 and selects a new data segment for processing.

Figure 4:
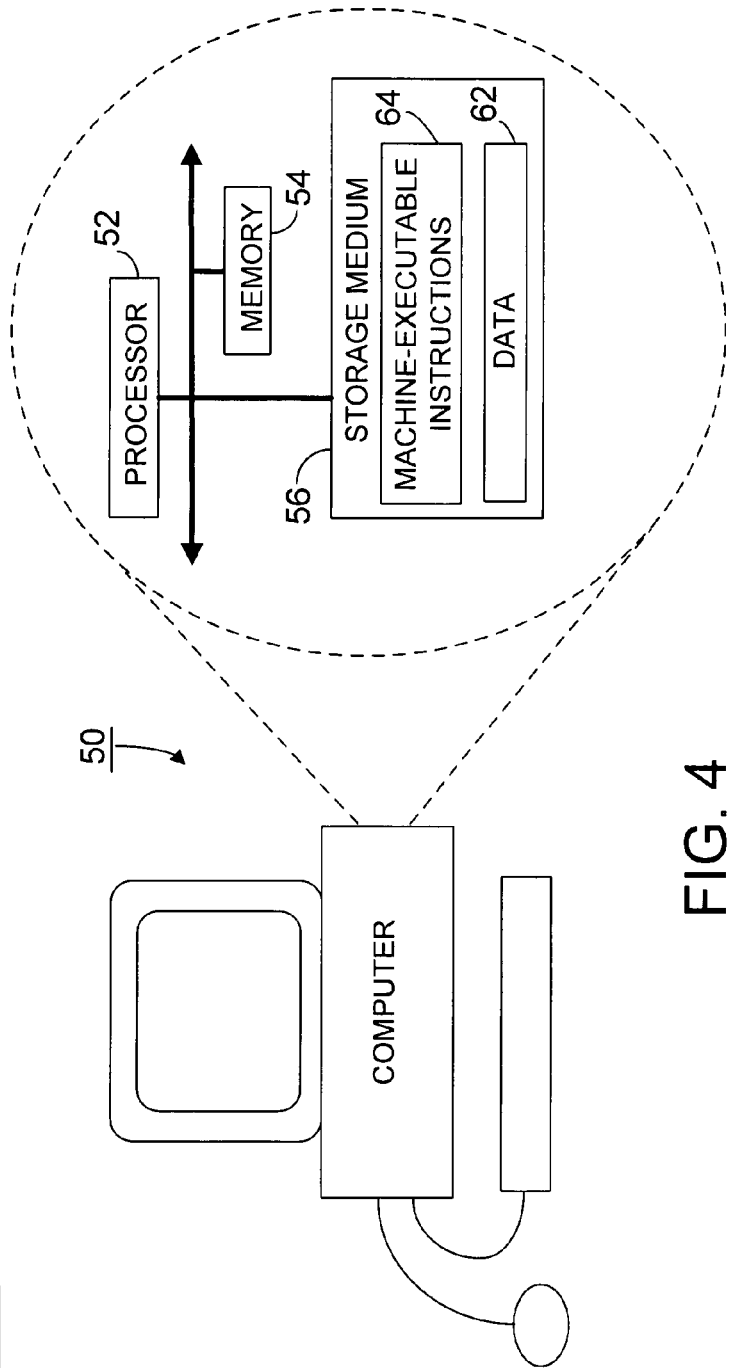
FIG. 4 is a view of computer hardware on which the process of FIG. 1 may be implemented.

FIG. 4 shows a computer 50 for performing process 10. Computer 50 includes a processor 52 (e.g., a microprocessor, controller, etc.), a memory 54, and a storage medium 56 (e.g., a hard disk)(see view 60). Storage medium 56 stores data 62, such as network data packets, and machine-executable instructions 64, which are executed by processor 52 out of memory 54 to perform process 10 on data 62.

Process 10, however, is not limited to use with the hardware and software of FIG. 4; it may find applicability in any computing or processing environment. Process 10 may be implemented in hardware, software, or a combination of the two. Process 10 may be implemented in computer programs executing on programmable computers that each includes a processor, a storage medium readable by the processor (including volatile and non-volatile memory and/or storage elements), at least one input device, and one or more output devices. Program code may be applied to data entered using an input device, such as a mouse or a keyboard, to perform process 10 and to generate output information.

Each such program may be implemented in a high level procedural or object-oriented programming language to communicate with a computer system. However, the programs can be implemented in assembly or machine language. The language may be a compiled or an interpreted language.

Each computer program may be stored on an article of manufacture, such as a storage medium (e.g., CD-ROM, hard disk, or magnetic diskette) or device (e.g., computer peripheral), that is readable by a general or special purpose programmable computer for configuring and operating the computer when the storage medium or device is read by the computer to perform process 10. Process 10 may also be implemented as a machine-readable storage medium, configured with a computer program, where, upon execution, instructions in the computer program cause a machine to operate in accordance with process 10.

Embodiments of process 10 may be used in a variety of applications. Although process 10 is not limited in this respect, process 10 may be used with memory devices in microcontrollers, general purposed microprocessors, digital signal processors (DSPs), reduced instruction-set computing (RISC), and complex instruction-set computing (CISC), among other electronic components. However, it should be understood that process 10 is not limited to use with these examples.

Embodiments of process 10 may also be included in integrated circuit blocks referred to as core memory, cache memory, or other types of memory that store electronic instructions to be executed by a microprocessor or store data that may be used in arithmetic operations. Note that embodiments may be integrated into radio systems or hand-held portable devices. Thus, laptop computers, personal communication systems (PCS), personal digital assistants (PDAs), and other products may be used with process 10.

Other embodiments not described herein are also within the scope of the following claims. For example, the blocks of FIG. 1 may be rearranged and/or executed out of order to produce the results described above. Process 10 may be used to perform any type of data comparison and is not limited to performing a deep packet inspection to locate the signature of a data packet.

What is claimed is:

1. A method, comprising:
retrieving, from a first hash table, a target value that corresponds to a segment of the data, the target value identifying signature data, the signature data including the segment of data, and the signature data exceeding the segment of data in length;
locating the signature data in a data packet;
processing the signature data to produce a checksum;
locating an entry in a second hash table using the checksum; and
comparing the signature data to the entry and outputting an indication indicating whether or not the signature data matches the entry;
wherein the target value corresponds to a length of the signature data.

2. The method of claim 1, wherein the target value comprises a number of bytes in the signature data.

3. The method of claim 1, wherein processing the data comprises processing a number of bytes indicated by the target value to produce the checksum.

4. The method of claim 1, wherein the signature data comprises the segment of data plus an increment.

5. The method of claim 1, wherein the checksum comprises a first checksum, and the method further comprises:
obtaining a second target value that corresponds to the signature data plus an increment; and
determining a second checksum using the first checksum and the increment.

6. The method of claim 5, further comprising:
locating a second entry in the second hash table using the second checksum; and
comparing the signature data plus the increment to the second entry.

7. The method of claim 1, further comprising:
indicating a match if the signature data and the entry are the same.

8. The method of claim 1, wherein the signature data is used to identify the data packet to a network device.

9. The method of claim 1, wherein the signature data is located in the data packet using the target value.

10. An apparatus comprising:
a memory that stores executable instructions; and
a processor that executes the instructions to:
retrieve, from a first hash table, a target value that corresponds to a segment of the data, the target value identifying signature data, the signature data including the segment of data, and the signature data exceeding the segment of data in length;
locating the signature data in a data packet;
processing the signature data to produce a checksum;
locating an entry in a second hash table using the checksum; and
comparing the signature data to the entry and outputting an indication indicating whether or not the signature data matches the entry;
wherein the target value corresponds to a length of the signature data.

11. The apparatus of claim 10, wherein the target value comprises a number of bytes in the signature data.

12. The apparatus of claim 10, wherein processing the data comprises processing a number of bytes indicated by the target value to produce the checksum.

13. The apparatus of claim 10, wherein the signature data comprises the segment of data plus an increment.

14. The apparatus of claim 10, wherein the checksum comprises a first checksum, and the processor executes instructions to:
   obtain a second target value that corresponds to the signature data plus an increment; and
   determine a second checksum using the first checksum and the increment.

15. The apparatus of claim 14, wherein the processor executes instructions to:
   locate a second entry in the second hash table using the second checksum; and
   compare the signature data plus the increment to the second entry.

16. The apparatus of claim 10, wherein the processor executes instructions to:
   indicate a match if the signature data and the entry are the same.

17. The apparatus of claim 10, wherein the signature data is used to identify the data packet to a network device.

18. The apparatus of claim 10, wherein the processor executes instructions to locate the signature data in the data packet using the target value.

19. An article comprising a machine-readable medium that stores executable instructions to compare data, the instructions causing a machine to:
   retrieve, from a first hash table, a target value that corresponds to a segment of the data, the target value identifying signature data, the signature data including the segment of data, and the signature data exceeding the segment of data in length;
   locating the signature data in a data packet;
   processing the signature data to produce a checksum;
   locating an entry in a second hash table using the checksum; and
   comparing the signature data to the entry and outputting an indication indicating whether or not the signature data matches the entry;
   wherein the target value corresponds to a length of the signature data.

20. The article of claim 19, wherein the target value comprises a number of bytes in the signature data.

21. The article of claim 19, wherein processing the data comprises processing a number of bytes indicated by the target value to produce the checksum.

22. The article of claim 19, wherein the signature data comprises the segment of data plus an increment.

23. The article of claim 19, wherein the checksum comprises a first checksum, and wherein the article comprises instructions for causing the machine to:
   obtain a second target value that corresponds to the signature data plus an increment; and
   determine a second checksum using the first checksum and the increment.

24. The article of claim 23, further comprising instructions that cause the machine to:
   locate a second entry in the second hash table using the second checksum; and
   compare the signature data plus the increment to the second entry.

25. The article of claim 19, further comprising instructions that cause the machine to:
   indicate a match if the signature data and the entry are the same.

26. The article of claim 19, wherein the signature data is used to identify the data packet to a network device.

27. The article of claim 19, further comprising instructions to locate the signature data in the data packet using the target value.

* * * * *